(12) United States Patent  (10) Patent No.: US 7,390,124 B2
Kienitz  (45) Date of Patent: Jun. 24, 2008

(54) DEVICE FOR CONTACT-FREE MEASUREMENT OF TEMPERATURE

(75) Inventor: Ulrich Kienitz, Basdorf (DE)

(73) Assignee: Optris GmbH, Berlin (DE)

( * ) Notice: Subject to any disclaimer, the term of this patent is extended or adjusted under 35 U.S.C. 154(b) by 0 days.

(21) Appl. No.: 11/330,574

(22) Filed: Jan. 12, 2006

(65) Prior Publication Data

US 2006/0114966 A1 Jun. 1, 2006

Related U.S. Application Data

(63) Continuation of application No. PCT/DE2004/001672, filed on Jul. 28, 2004.

(30) Foreign Application Priority Data

Jul. 30, 2003 (DE) ................................ 103 35 206
Sep. 17, 2003 (DE) ................................ 103 43 258

(51) Int. Cl.
G01J 5/08 (2006.01)
G01K 1/02 (2006.01)
(52) U.S. Cl. .................... 374/131; 374/120; 374/141; 250/338.1; 250/491.1
(58) Field of Classification Search ................. 374/120, 374/121, 130–131, 141; 356/399; 250/491.1
See application file for complete search history.

(56) References Cited

U.S. PATENT DOCUMENTS

| 3,619,059 | A | * | 11/1971 | Muller et al. ................. 356/45 |
|---|---|---|---|---|
| 4,315,150 | A | * | 2/1982 | Darringer et al. ........ 250/338.1 |
| 4,326,798 | A | * | 4/1982 | Kahn ........................... 356/45 |
| 4,343,182 | A | * | 8/1982 | Pompei ....................... 374/31 |
| 5,172,978 | A | * | 12/1992 | Nomura et al. ............. 374/130 |
| 5,335,308 | A | * | 8/1994 | Sorensen ..................... 392/412 |
| 5,352,039 | A | | 10/1994 | Barral et al. |
| 5,368,392 | A | | 11/1994 | Hollander et al. |
| 5,561,294 | A | * | 10/1996 | Iddan ......................... 250/330 |
| 5,584,137 | A | * | 12/1996 | Teetzel ....................... 42/117 |
| 5,628,034 | A | * | 5/1997 | McIntyre ..................... 396/52 |
| 5,675,408 | A | * | 10/1997 | Samuelsson et al. ........ 356/155 |
| 5,796,517 | A | * | 8/1998 | Sensui et al. ................ 359/426 |
| 5,823,679 | A | * | 10/1998 | Hollander et al. ........... 374/121 |
| 5,836,694 | A | * | 11/1998 | Nguyen ...................... 374/130 |
| 5,839,829 | A | * | 11/1998 | Litvin et al. ................. 374/121 |
| 5,945,658 | A | * | 8/1999 | Salatto et al. ........... 235/462.22 |
| 6,095,682 | A | * | 8/2000 | Hollander et al. ........... 374/121 |
| 6,196,714 | B1 | * | 3/2001 | Bellifemine et al. ........ 374/121 |
| 6,234,669 | B1 | * | 5/2001 | Kienitz et al. ............... 374/130 |
| 6,266,911 | B1 | * | 7/2001 | Suzuki ........................ 42/119 |

(Continued)

FOREIGN PATENT DOCUMENTS

DE 32 13 955 A1 10/1982

(Continued)

*Primary Examiner*—Gail Verbitsky
(74) *Attorney, Agent, or Firm*—Alston & Bird LLP

(57) ABSTRACT

A device for measuring the temperature of a measured spot of a measured object without contacting the measured object is provided. The device includes a detector on which electromagnetic radiation emanating from the measured spot is projected by an optical imaging system. A sighting device for marking the position and/or the size of the measured spot includes at least two light sources. Each of the two light sources provides a respective sighting ray.

28 Claims, 4 Drawing Sheets

U.S. PATENT DOCUMENTS

| | | | |
|---|---|---|---|
| 6,377,400 B1 | 4/2002 | Hollander | |
| 6,742,927 B2 * | 6/2004 | Bellifemine | 374/121 |
| 6,765,653 B2 * | 7/2004 | Shirai et al. | 356/426 |
| 6,891,141 B2 * | 5/2005 | Kaneko et al. | 250/201.2 |
| 6,951,411 B1 * | 10/2005 | Kumar et al. | 362/284 |
| 6,960,749 B1 * | 11/2005 | Nakamura | 250/201.2 |
| 7,307,255 B2 * | 12/2007 | Hollander et al. | 250/338.1 |
| 2002/0027594 A1 * | 3/2002 | Beier et al. | 347/241 |
| 2002/0048307 A1 * | 4/2002 | Schmidt | 374/121 |
| 2002/0078221 A1 * | 6/2002 | Blackwell et al. | 709/231 |
| 2002/0122248 A1 * | 9/2002 | Heinrich | 359/425 |
| 2004/0196888 A1 * | 10/2004 | Musbach et al. | 374/120 |
| 2006/0291531 A1 * | 12/2006 | Hollander et al. | 374/121 |

FOREIGN PATENT DOCUMENTS

| | | |
|---|---|---|
| DE | 34 03 372 C1 | 7/1985 |
| DE | 44 40 843 A1 | 5/1995 |
| DE | 9 422 197 U1 | 4/1998 |
| DE | 196 54 276 A1 | 6/1998 |
| DE | 196 54 211 A1 | 8/1998 |
| DE | 9 422 259 U1 | 9/1999 |
| DE | 298 07 075 U1 | 10/1999 |
| EP | 0 644 408 A1 | 3/1995 |
| EP | 1 085 307 A1 | 3/2001 |
| EP | 1 176 407 A2 | 1/2002 |
| GB | 696604 A | 9/1953 |
| GB | 2 380 791 A1 | 4/2003 |
| JP | 57022521 A | 5/1982 |

* cited by examiner

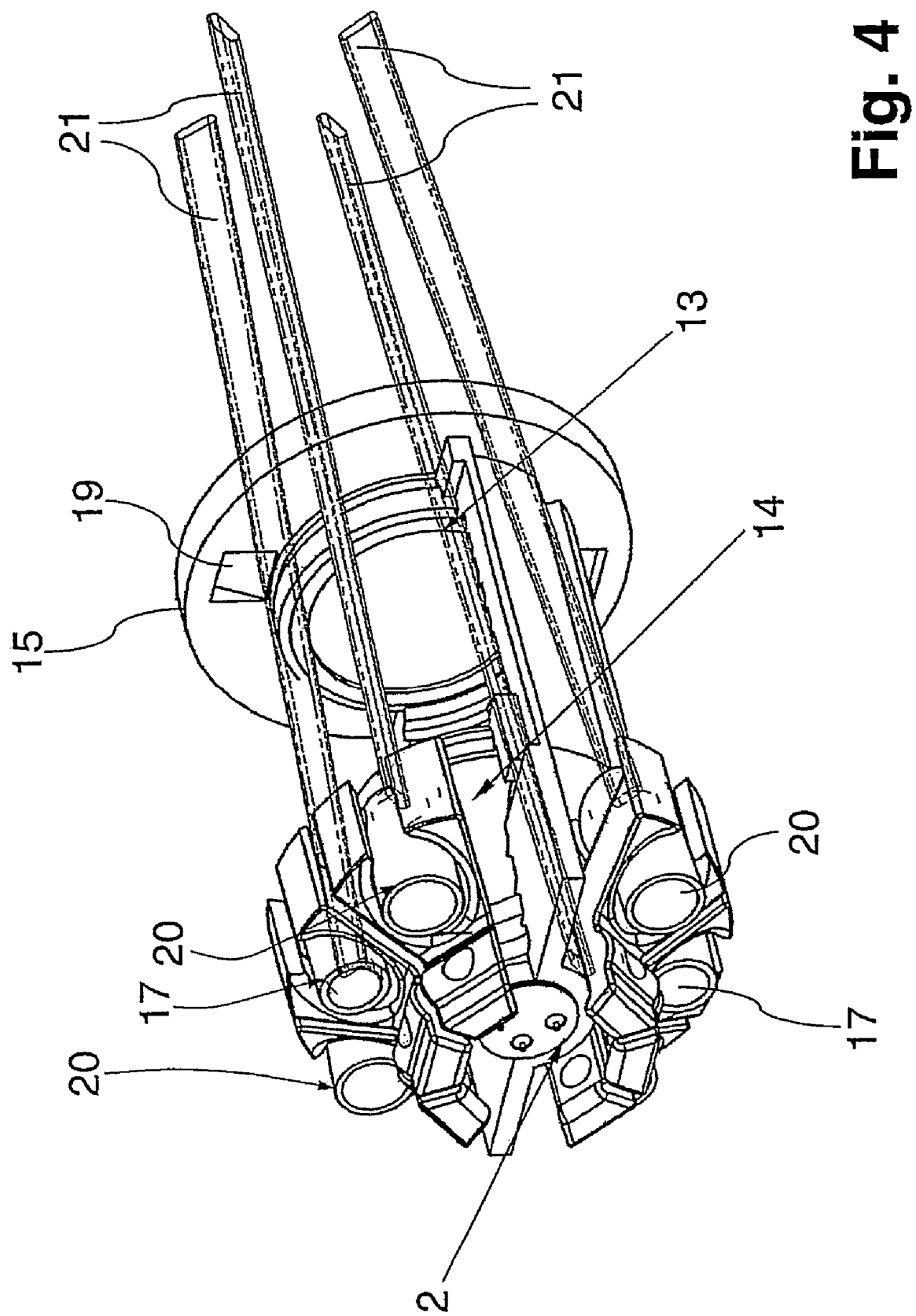

DEVICE FOR CONTACT-FREE MEASUREMENT OF TEMPERATURE

CROSS-REFERENCE TO RELATED APPLICATIONS

This application is a continuation of, and claims the benefit of priority to international PCT application number PCT/DE2004/001672, which was filed on Jul. 28, 2004, and which designates the United States. The disclosure of the referenced international PCT application is hereby incorporated herein by reference.

FIELD OF THE INVENTION

The invention relates to a device, for the contact-free measurement of temperature, with a detector onto which electromagnetic radiation emanating from a measured spot on a measured object can be imaged by means of imaging optics, and with a sighting device for marking the position and/or the size of the measured spot on the measured object, where the sighting device has a light source to provide at least two sighting beams.

BACKGROUND OF THE INVENTION

Devices for the contact-free measurement of temperature of the type under discussion have been known from practice for many years and are used to measure the temperature of a surface of a distant object. In the case of these measurements one utilizes the physical phenomenon that all surfaces with a temperature above absolute zero radiate electromagnetic waves because of molecular motion. This thermal radiation emanating from an object lies mainly in the infrared range and can be guided via infrared-sensitive imaging optics onto one or more infrared detectors. There the radiant energy is converted into electrical signals which can then be converted into temperature values based on the calibration of the detector. The temperature values measured can then be shown on a display, output as an analog signal, or represented via a digital output on a computer terminal.

The area of the object whose radiation is detected by the detector will be designated in general as a (radiation-) measured spot of the temperature-measuring device. In practical use knowledge of the location and the size of the measured spot is of the greatest importance for the precision and reliability of the temperature measurement. In that regard, the place and size of the measured spot are dependent on the construction and measuring ray path of the detector as well as on the special properties of the imaging optics. The curve of the size of the measurement spot as a function of the measurement distance also depends on the structure of the imaging optics.

In principle, long-range focusing can be distinguished from short-range focusing. In the case of long-range focusing, the detector is imaged at infinity and in the case of short-range focusing on a focus plane at a finite distance from the detector. For both systems, different sighting devices for visualizing the measured spot are known. In those devices optical markings are produced in the center of the measured spot for the marking of the precise position of the measured spot or, additionally or alternatively, along the outer circumference of the measured spot for marking the size of the measured spot.

Known from DE 196 54 276 A1 and U.S. Pat. No. 6,234,669, is a device for the contact-free measurement of temperature with optics imaging at a finite distance. There, several sighting rays are provided which are directed skew to the optical axis and aligned to each other in such a manner that each sighting ray, both in front of and behind, a focus point measured spot can be used to mark the size of the measured spot. The sighting rays are generated by a light source and diffractive optics disposed behind the light source, for example, in the form of a hologram. Here it is disadvantageous that for the generation of the plurality of sighting rays elaborate diffractive optics is necessary. The degree of efficiency of diffractive components of this type and their imaging quality is limited.

It is also a known practice to visualize the measured spot with a marking which is perceptible as a line completely encircling the measured spot. A continuous encircling of the measured spot is, for example, perceptible when a laser ray is guided with a rapidly rotating mirror around the measured spot, as is disclosed, for example, in U.S. Pat. No. 5,368,392. Due to their consumption of energy and an increased susceptibility to interference, movable mechanical components are disadvantageous in the framework of contact-free temperature measurement, in particular with the use in mobile infrared temperature measurements.

BRIEF SUMMARY OF THE INVENTION

The objective of the present invention is to develop and extend a device, of the generic type, for the contact-free measurement of temperature so that with simple means an economical and low-interference visualization of the position and/or the size of the measured spot on the measured object is made possible.

The device according to the invention for the contact-free measurement of temperature realizes the above objective by the provision of a generic device which is developed and extended in such a manner that an independent light source is provided for the generation of each sighting ray.

According to the invention it has been recognized that devices for contact-free measurement of temperature of the type under discussion here always bring with them the problem that for clearly visible and reliable marking of the measured spot several sighting rays must be generated. This problem is solved in an elegant manner by the fact that to generate each sighting ray an independent light source is provided. In so doing, it has been recognized that light sources, e.g. in the form of laser diodes, are inexpensively available as mass-production products and are easy to use. Therewith elaborate ray splitter devices or complicated rotating components can be completely omitted so that the problem of susceptibility to interference is effectively solved. In addition to this, in case of a failure the device can also continue to be used, at least to a limited extent.

In a particularly advantageous manner it could be provided that the distance of the measured spot focus point from the detector can be changed from a near position to a distant position and vice versa. This could happen while retaining the imaging optics in a simple manner by the fact that the detector can be traversed along the optical canal in a precise and reproducible manner. A development of this type would take account of the practical requirements, according to which it is frequently desirable to detect small objects at a short distance as well as larger objects at a greater distance with the same temperature-measuring device. In the case of long-range focusing—i.e. the measured spot focus point is located at a distant position—the detector could be imaged via the imaging optics, for example, at infinity, while for the short-range focusing—i.e. the measured spot focus point is located at a near position—a distance of the measured spot focus point from the measuring device of 10 cm could be provided.

Alternatively to a capability of traversing or a capability of repositioning the detector along the optical canal a capability of switching between short-range focusing and long-range focusing by means of a special imaging optics can be achieved. For these capabilities the imaging optics comprises two lenses disposed one after another in the optical canal. Preferably both lenses are implemented in such a manner that they are identical, whereby the production costs can be reduced significantly. For switching from short-range focusing to long-range focusing a lens, preferably the lens facing the detector, can be implemented in such a manner that it can be repositioned along the optical canal, in particular traversed. In other words, the imaging optics is implemented in the sense of a vario objective so that the location of the detector with respect to the focal distance is changed via a change of the focal length of the imaging optics. In order to ensure a simple and reproducible repositioning of the lens it is possible, for example, to provide a snap and/or catch mechanism in the sense of a spring mimic.

So that at a near position as well as at a distant position the marking generated by means of the sighting device gives the position and the size of the measured spot on the measured object correctly, the sighting device could accordingly also be embodied in such a manner that it can be switched. For a switch between the short-range focusing and long-range focusing, for example, a mechanical device could be provided by means of which the angular position of the lasers with respect to one another can be changed. This tilting of the lasers could be performed manually as well as by motor. In regard to good reproducibility of the laser positions external and internal stops could be provided which limit the angular position of the lasers. In so doing, the external stop could be implemented in such a manner that the laser is adjusted in the stop position for long-range focusing. The corresponding applies to the internal stop and the adjustment of the laser for short-range focusing.

In addition to, or alternatively to, the above-described mechanical change of the laser position it could be possible to change the alignment of the sighting devices by means of an optical device. The optical device could, for example, be a prism with which the sighting ray is refracted in the desired direction. In so doing, the long-range focusing could be realized without a prism and to switch to short-range focusing it could be possible to introduce a prism into the ray path of the sighting ray. Also it is conceivable for short-range focusing as well as for long-range focusing to provide a prism in the ray path, where in this case by rotating the prism a change of the angle of refraction of the sighting ray and thus the capability of switching between short-range focusing and long-range focusing is possible. The prism's angular position corresponding to short-range focusing and long-range focusing could in this case once again be limited by mechanical stops.

In a particularly advantageous manner it could be provided that one does not change individual lasers or individual laser rays in order to switch from short-range focusing to long-range focusing and vice versa but rather that certain lasers are adjusted for short-range focusing and other lasers are adjusted for long-range focusing. For example, two of the sighting rays could identify the measured spot at a near position while the other sighting rays are used for marking the measured spot at a distant position. A change of focus could then be done particularly simply by turning the corresponding laser on or off.

From the standpoint of construction the sighting device could, for example, comprise a total of eight lasers which are disposed in a circle around the optical canal. In this arrangement, the two lasers for short-range focusing, i.e. for marking the near position of the measured spot focus point on the optical axis, could run skew to the optical axis and be aligned in such a manner that the two sighting rays match the detector ray path and intersect on the optical axis at the measured spot focus point. Due to the small extension, almost a single point, of the measured spot at a near position, the resulting point of intersection of the two sighting rays agrees to good approximation with the actual size of the measured spot.

The remaining six lasers could then all be used for the visualization of the measured spot at a distant position by their namely being aligned parallel to the optical canal of the detector. For remote objects the six sighting rays form, due to the circular arrangement of the lasers around the optical canal of the detector, a visible circle of six points of light on the object, where those points of light mark the position and the size of the measured spot on the measured object.

Let it be noted that the measured spot at a distant position in principle could naturally also be marked by a larger or smaller number of lasers, thus, for example, by four or eight lasers. With the use of four lasers however, only an insufficient optical impression of a circle results while the use of eight lasers makes the measuring device more elaborate and expensive in its production without at the same time contributing to a significant improvement with regard to the clarity of the marking of the measured spot.

In regard to a simple mode of construction all the lasers could be disposed around the optical canal in such a manner that they are equidistant from one another. In regard to a comprehensible and clear marking of the measured spot however, disposing the six lasers for the visualization of the measured spot at a distant position around the optical canal in such a manner that they are equidistant from one another is to be preferred so that adjacent lasers are each at an angle of 60° with one another. The two lasers for marking the measured spot at a near position could then be disposed at any points between the lasers for marking the measured spot at a distant position, where they are positioned, with respect to the optical canal, opposite one another in an advantageous manner.

In regard to the capability of user-friendly operation and to most substantially avoiding incorrect adjustments on the user side, the device could be equipped in such a manner that the switching of the sighting device is done automatically as a function of the detector position. If the detector is located—e.g. for the measurement of the temperature of a small measured spot at a short distance—in the position which corresponds to the near position of the measured spot focus point, then the six lasers for long-range focusing could automatically become inactive, i.e. switched off. They would be automatically activated, i.e. switched on, as soon as the detector is in the other position, i.e. corresponding to the distant position of the measured spot focus point.

In an especially elegant and user-friendly development the lasers could be individually drivable by means of electronics. In concrete terms the lasers could then each be driven in the circumferential direction of the optical canal in sequence with a slight delay. By a rotation of this type the impression of a rotating circular arrangement would arise. The optical impression evoked would be arbitrarily changeable between the drive of adjacent lasers according to the delay times set.

It is of quite particular advantage in this connection to choose the frequency of the laser drive to be proportional to the measured temperature. For example, the higher the measured temperature is, the faster the rotation could take place.

Another possibility for the visualization of the results of the measurement consists of changing the color of the sighting rays as a function of the measured temperature. This could, for example, be achieved by mixing of green or red laser light, where the use of additional lasers of different colors would also be conceivable. Thus, on overshoot of a predefined threshold temperature, automatic switching from, for example, red lasers to green lasers could be provided.

Along with the stated indirect methods for the visualization of the measured values the measured temperature could naturally also be made directly visible, for example, on a separate display. In practical use a display has nonetheless proven itself disadvantageous to the sense that users must avert their gaze from the measured spot to read off the measured value of the temperature on the display. A change of the alignment of the measuring device is frequently connected with averting their gaze, which consequently has a faulty temperature display as a result. Thus a device could be provided by means of which the measured temperature, or also other arbitrary information, could be projected directly onto the measured spot, or at least in the immediate vicinity of the measured spot. A user would thus be in the position with the aid of the optically visible marking generated by means of the sighting device to monitor the correct alignment of the measuring device and at the same time to read off the measured temperature.

In a particularly advantageous manner a camera could be provided in addition, with which an exposure of the measured object including the measured spot and the projected temperature display can be prepared. Thereby a later evaluation and documentation of the measured results would be quite significantly simplified. Along with this, the focus setting of the camera could be done in particular together with the focusing of the sighting device. If the sighting device switches, for example, from long-range focusing to short-range focusing, then the focus of the camera could automatically be changed accordingly and in fact, for example, with the use of the aforementioned displacement mechanism for the detector and/or the sighting device or by providing separate means.

BRIEF DESCRIPTION OF THE DRAWINGS

There are different possibilities of developing and extending the teaching of the present invention in an advantageous manner. In this connection reference is to be made, on the one hand, to the claims and, on the other hand, to the following explanation of a preferred embodiment example of the invention with the aid of the drawings. In connection with the explanation of the preferred embodiment example of the invention with the aid of the drawings, preferred developments and extensions of the teaching are also explained in general. Shown in the drawings are:

FIG. 4 is a perspective view of the device from FIG. 3 in long-range focusing.

DETAILED DESCRIPTIONS OF EMBODIMENTS OF THE INVENTION

Figure 1:
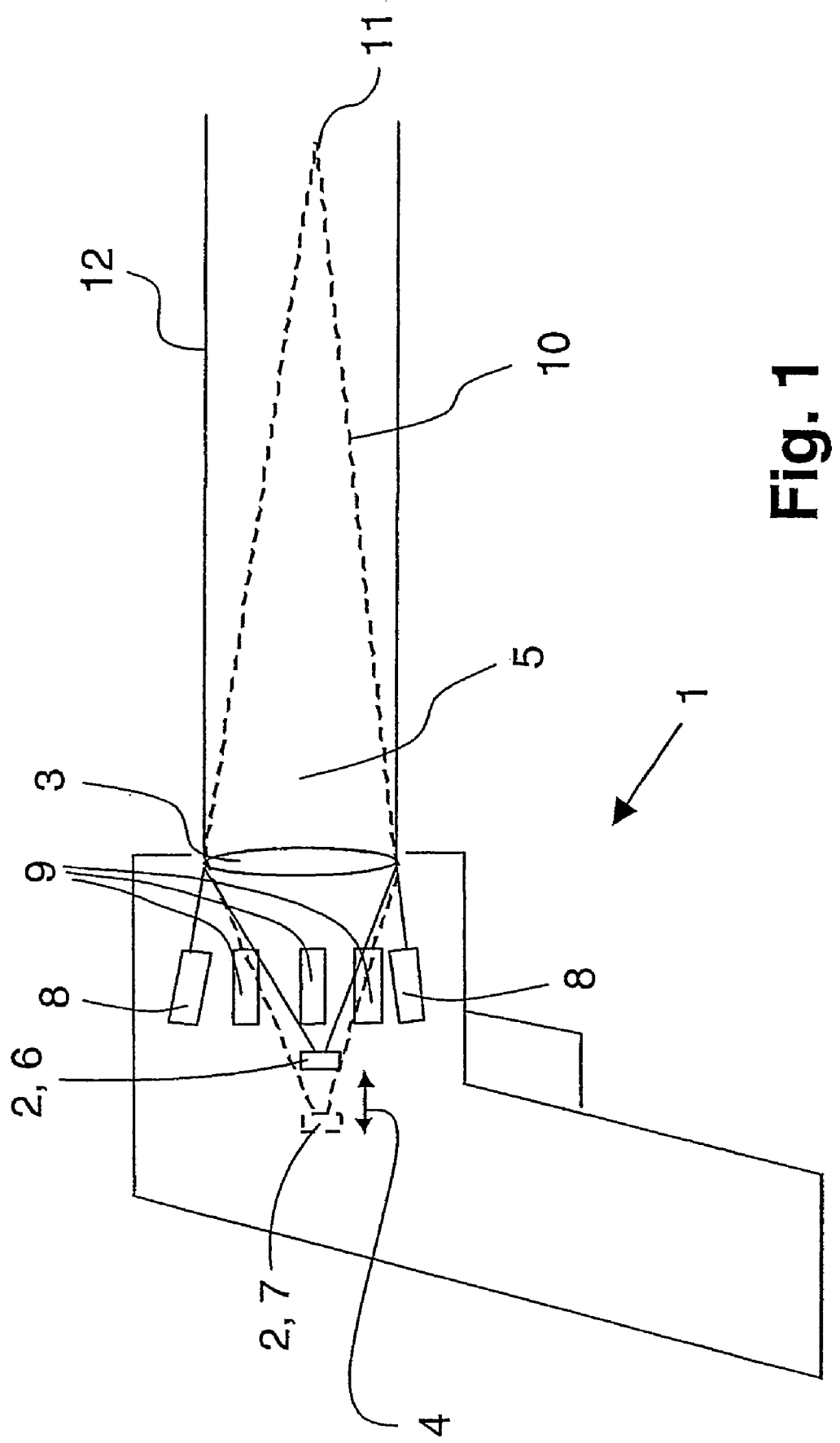
FIG. 1 is a schematic side view of a device according an embodiment of the invention for contact-free temperature measurement.

FIG. 1 shows in schematic side view a conceptual representation of a device according to the invention for contact-free temperature measurement in the form of a manual measuring device 1. Therein the measuring device 1 comprises an IR detector 2, onto which the thermal radiation emanating from an object (not represented) can be imaged by means of an optical system. In the embodiment example according to FIG. 1, the optical system is implemented as a simple convex lens 3 which focuses the thermal radiation onto the detector 2.

As indicated by the double arrow 4, the detector 2 is precisely and reproducibly traversable between two positions along the axis of an IR optical canal 5. In concrete terms, it is, in one case, the position 6, marked with solid lines, which corresponds to the distant position of the measured spot focus point. In this case the detector 2 is disposed at the focal point of the convex lens 3 and is consequently imaged at infinity by the convex lens 3. The second position 7, marked with dotted lines, corresponds to the near position of the measured spot focus point. If the detector 2 is located at this position, then the measured spot focus point comes to lie at a finite distance from the measuring device 1. In practical use the measuring device 1 thus permits on the one hand, for example, 2-mm-large objects at a distance of 10 cm to be measured (short-range focusing) and on the other hand, for example, 5-m-distant objects with a diameter of 10 cm to be detected (long-range focusing).

Around the optical canal 5 a total of eight laser diodes 8, 9 are disposed in a circle, where only the upper and the lower laser diodes 8 as well as the three laser diodes 9 disposed on the, with respect to the side view of FIG. 1, front semicircle can be seen. The upper and lower laser diodes 8 are disposed skew to the optical axis 5 and are used for short-range focusing. For this, the two laser diodes 8 are aligned in such a manner that they match the detector ray path 10 which results if the detector 2 is traversed into the position 7 for short-range focusing. The sighting rays of the two laser diodes 8 then intersect at the measured spot 11. For users this means that they must change the distance of the measured device 1 from the measured object until the two sighting rays appear congruent on the measured object.

If the user would like to detect objects further away, then the measured device 1 can be switched by the detector 2 being traversed into the position 6 for long-range focusing. As soon as the detector 2 reaches the position 6 the sighting device is switched by the, in total, 6 laser diodes 9 being automatically activated and the two laser diodes 8 being deactivated. The laser diodes 9 are aligned parallel to the optical canal 5 and are adapted to the imaging optics in such a manner that they precisely match the detector ray path 12 for long-range focusing.

Figure 2:
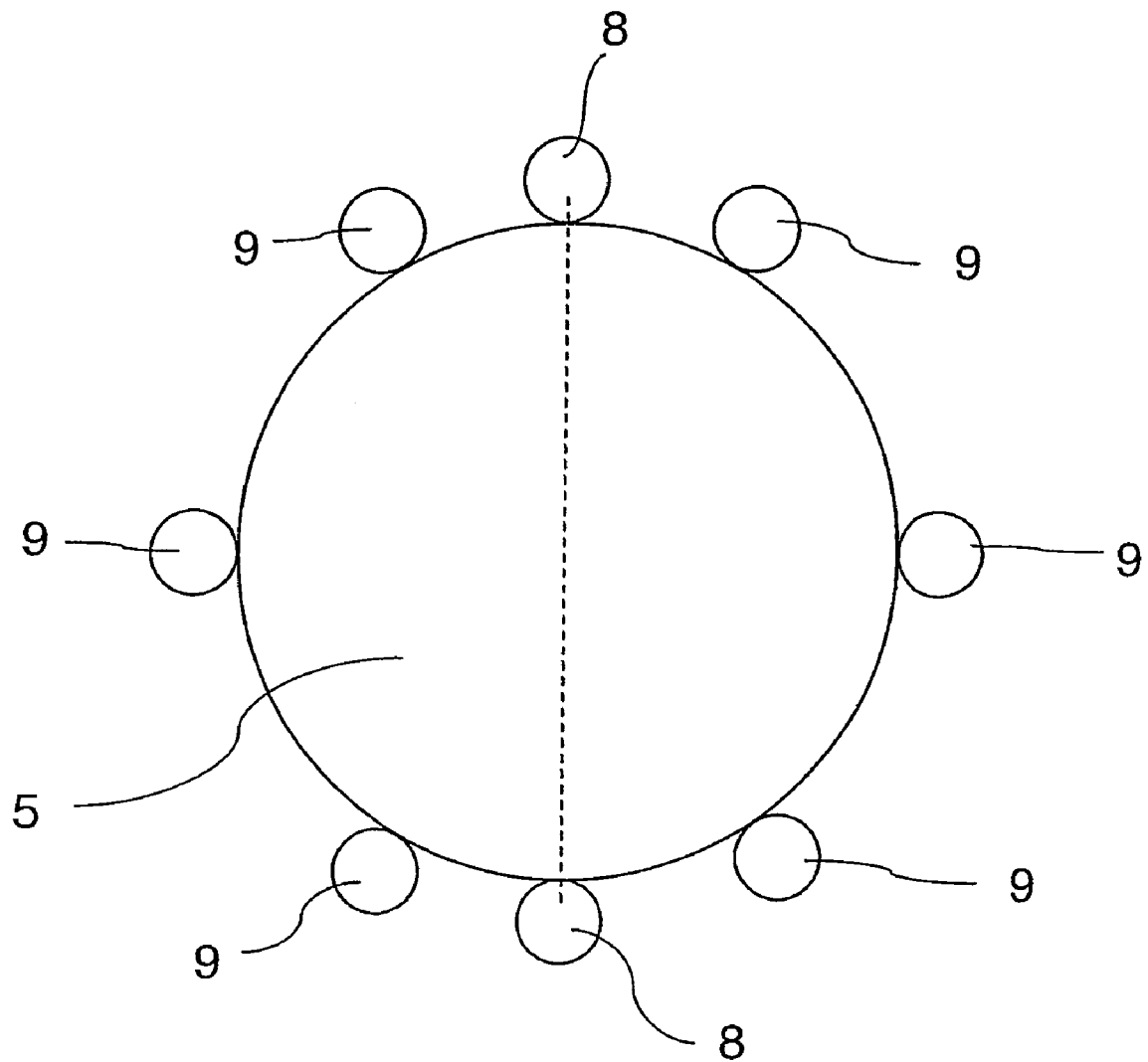
FIG. 2 is a schematic representation the device from FIG. 1 in a view along the optical canal.

From FIG. 2, which shows the measured device 1 in a schematic representation along the optical canal 5, the precise arrangement of the laser diodes 8, 9 can be seen. The lasers 8, 9 are disposed in a circle around the optical canal 5, where for the visualization of the measured spot 11 at a near position the two lasers 8 lie opposite one another in relation to optical canal 5. The other six lasers 9 for long-range focusing are disposed in such a manner that they are equidistant from one another, where each two adjacent laser diodes 9 are at an angle of 60° to one another. In this manner a symmetric, circular illumination pattern is produced which marks the outer circumference of the measured spot on the measured object.

Figure 3:
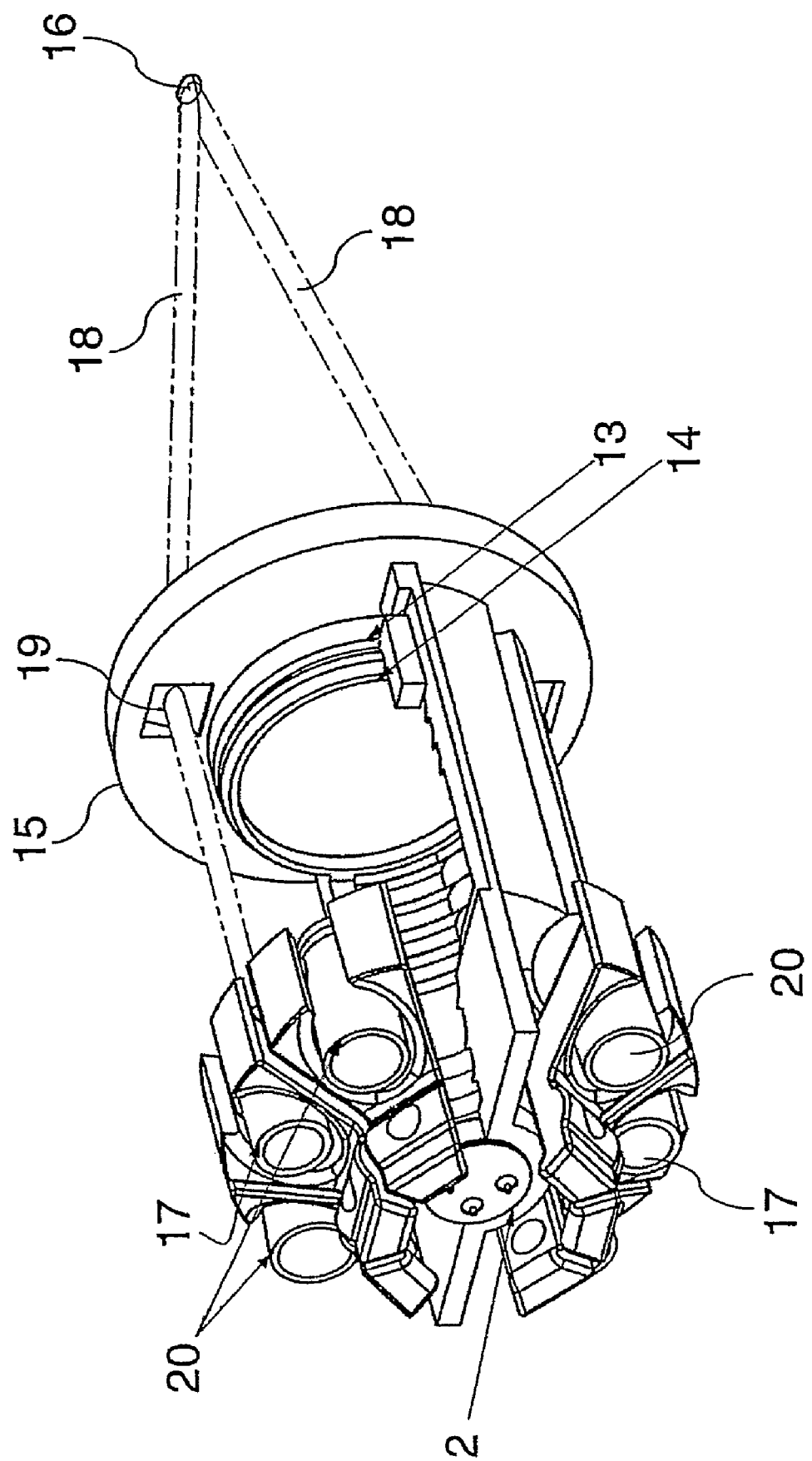
FIG. 3 is a perspective view of an embodiment of a device according to the invention for the contact-free measurement of temperature in short-range focusing.

FIG. 3 shows—schematically—in a perspective view an embodiment example of a device according to the invention with imaging optics comprising two identically implemented convex lenses 13, 14. The lens 13 facing away from the IR detector is held at a fixed distance from the IR detector 2 in a window ring 15. The second lens 14 facing the IR detector 2 can be traversed along the IR-optical canal 5. In the embodiment example represented the traversing of the lens 14 is done in a reproducible manner between two different positions. In FIG. 3 the lens 14 is located in a position which corresponds to short-range focusing, that is, the resulting focus point 16 is at a short distance from the detector 2.

For the optical visualization of the focus point 16 two laser modules 17 opposite one another are active, where the sighting rays 18 generated by the laser modules 17 are focused onto the focus point 16 by optical elements 19 integrated into the window ring 15.

The traversing of the lens 14 along the optical canal 5 is done via a snap and/or catch device which is formed in the sense of a spring mimic. The device can be actuated from outside via a slide. Alternatively, a thread can be provided so that the lens 14 can be traversed by means of a rotation along the optical canal 5.

In FIG. 4 the same device as in FIG. 3 is represented and the same reference numbers denote the same components. In contradistinction to the representation in FIG. 3 the lens 14 is located in the position corresponding to long-range focusing, near to the IR detector 2. With this positioning of the lens 14 the laser modules 17 are deactivated. Meanwhile, the four laser modules 20 are activated of which only three can be seen due to the perspective representation. The alignment of the laser modules 20 is adapted to the imaging optics in such a manner that the generated sighting rays 21 correspond to the detector ray path for long-range focusing.

Finally, let it be expressly pointed out that the above-described embodiment example merely serves to explain the claimed teaching but does not restrict it to this embodiment example.

That which is claimed:

1. A measuring device for measuring the temperature of a measured spot of a measured object without contacting the measured object, said measuring device comprising:
    a detector;
    an optical imaging system for projecting electromagnetic radiation from a measured spot of a measured object onto said detector; and
    a sighting device for marking the position and/or the size of the measured spot on the measured object, said sighting device comprising at least two light sources that each provide a respective sighting ray;
    wherein the optical imaging system defines a focus point of the measured spot from said detector, the focus point being adjustable with respect to the detector, in a reproducible manner, from a near position to a distant position and from the distant position to the near position;
    wherein at least one of said respective sighting rays of the sighting device is dedicated to short-range marking and at least one other of said respective sighting rays of the sighting device is dedicated to long-range marking; and
    wherein said sighting device is equipped to automatically switch between short-range marking and long-range marking upon the focus point being adjusted from the near position to the distant position.

2. A measuring device according to claim 1, wherein each of the two light sources comprises a respective laser diode.

3. A measuring device according to claim 1, wherein said detector defines an optical canal, and wherein said detector is movable along the optical canal.

4. A measuring device according to claim 1, wherein said optical imaging system comprises a first lens and a second lens that is identical to the first lens.

5. A measuring device according to claim 4, wherein said detector defines an optical canal, wherein said detector is movable along the optical canal, wherein the first lens is disposed between the second lens and said detector, and wherein the first lens is movable along the optical canal.

6. A measuring device according to claim 5, wherein positioning of the first lens is realized by a snap and/or catch mechanism.

7. A measuring device according to claim 1, wherein each of the two light sources comprises a respective laser such that at least two lasers, each having a respective angular position, are provided, and wherein the angular positions of the at least two lasers are adjustable relative to one another by means of a mechanical device to switch the focusing of said sighting device.

8. A measuring device according to claim 7, further comprising outer and inner stops which limit the angular positions of the two lasers for short-range focusing and long-range focusing.

9. A measuring device according to claim 1, wherein the alignments of the sighting rays are adjustable by an optical device for a change of focusing.

10. A measuring device according to claim 9, further comprising at least two prisms for changing the alignments of the sighting rays.

11. A measuring device according to claim 10, wherein each of the two prisms is movable into the ray path of a respective sighting ray and/or is rotatable in the ray path of a respective sighting ray.

12. A measuring device according to claim 11, further comprising mechanical stops which limit the angular positions of the two prisms for short-range focusing and long-range focusing.

13. A measuring device according to claim 1, wherein at least two of the sighting rays are provided for the visualization of the measured spot at the near position and at least two other sighting rays are provided for the visualization of the measured spot at the distant position.

14. A measuring device according to claim 2, wherein the sighting device comprises eight lasers.

15. A measuring device according to claim 2, wherein said detector defines an optical canal, wherein each of the two light sources comprises a respective laser, and wherein the lasers are disposed in a circle around the optical canal.

16. A measuring device according to claim 15, wherein the lasers are disposed around the optical canal such that the lasers are disposed equidistant from one another.

17. A measuring device according to claim 13, wherein said detector defines an optical canal, and wherein the sighting rays for the visualization of the measured spot at the distant position are provided by lasers that are disposed around the optical canal equidistant from one another.

18. A measuring device according to claim 13, wherein the at least two sighting rays provided for the visualization of the measured spot at the near position intersect.

19. A measuring device according to claim 13, wherein said detector defines an optical canal, and wherein two of the sighting rays that are provided for the visualization of the measured spot at the distant position are provided by a respective two lasers that are disposed opposite one another with respect to the optical canal.

20. A measuring device according to claim 13, wherein said detector defines an optical canal, and wherein the sighting rays that are provided for the visualization of the measured spot at the distant position are each provided by a respective laser that is aligned parallel to the optical canal.

21. A measuring device according to claim 13, wherein the distance of the focus point is changed automatically according to the position of said detector.

22. A measuring device according to claim 2, wherein each laser diode is individually drivable by electronic means.

23. A measuring device according to claim 13, wherein said detector defines an optical canal, and wherein the sighting rays provided for the visualization of the measuring spot at the distant position are provided by lasers that are driven sequentially for the generation of a rotational effect in the direction of the circumference of the optical canal.

24. A measuring device according to claim 23, wherein the sequentially driven lasers are driven at a frequency that is proportional to the temperature of the measured spot on the measured object.

25. A measuring device according to claim 1, wherein the color of the sighting rays varies as a function of the temperature of the measured spot on the measured object.

26. A measuring device according to claim 1, further comprising a projection device for projecting the measured temperature, or other information, onto the measured spot, or in the vicinity of the measured spot.

27. A measuring device according to claim 1, further comprising a camera for the preparation of an exposure of the measured object including the measured spot.

28. A measuring device according to claim 27, wherein said camera has a focus setting that changes when the position of the measured spot changes and/or when a focus of said sighting device changes.

* * * * *